United States Patent [19]
Gerszberg et al.

[11] Patent Number: 5,970,473
[45] Date of Patent: Oct. 19, 1999

[54] VIDEO COMMUNICATION DEVICE PROVIDING IN-HOME CATALOG SERVICES

[75] Inventors: Irwin Gerszberg, Kendall Park; Jeffrey S. Martin, Dover; Hopeton S. Walker, Haledon, all of N.J.

[73] Assignee: AT&T Corp., New York, N.Y.

[21] Appl. No.: 09/001,421

[22] Filed: Dec. 31, 1997

[51] Int. Cl.⁶ .................................................. H04L 12/28
[52] U.S. Cl. ............................................... 705/26; 705/27
[58] Field of Search .................. 705/26, 27; 395/200.33, 395/200.47, 200.49, 200.57, 200.61

[56] References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,725,694 | 2/1988 | Auer et al. . |
| 4,916,441 | 4/1990 | Gombrich . |
| 4,992,940 | 2/1991 | Dworkin ................................. 705/26 |
| 5,014,267 | 5/1991 | Tompkins et al. . |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,434,394 | 7/1995 | Roach et al. ............................ 235/375 |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,619,684 | 4/1997 | Goodwin et al. . |
| 5,644,628 | 7/1997 | Schwarzer et al. . |
| 5,671,267 | 9/1997 | August et al. . |
| 5,682,195 | 10/1997 | Hendricks et al. . |
| 5,684,918 | 11/1997 | Abecassis . |

*Primary Examiner*—Thomas R. Peeso

[57] ABSTRACT

Catalog information stored in a database is accessible by remotely located customers in order to provide in-home shopping capabilities.

18 Claims, 14 Drawing Sheets

FIG. 5D

ORDER

| SIZE | TYPE | TOPPINGS |
|---|---|---|
| SMALL | REGULAR | MEATBALLS |
| MEDIUM | DEEP DISH | PEPPERONI |
| LARGE | HAND-TOSSED | SAUSAGE |
| | | ANCHOVIES |
| | | MORE ↓ |

SIDES

GREEN SALAD
BREADSTICKS

DELIVER

DELIVER

YOUR PIZZA WILL BE DELIVERED TO:

1313 MOCKINGBIRD LANE
ANYTOWN, USA

OK

CHANGE

PAYMENT

PAY NOW (CREDIT CARD)
PAY LATER (CASH ON CREDIT)

THANK YOU FOR ORDERING
PIZZA FROM COMPANY 2
WE APPRECIATE YOUR
BUSINESS.

```
HOME ELECTRONICS
─────────────────

STEREO EQUIPMENT
DVD PLAYERS
TELEVISIONS
COMPUTERS
VCRS
                              ◁ ▷
```

FIG. 6B

```
         TELEVISIONS
         ───────────

VIEW INFO BY:
        BY MANUFACTURER
        BY RETAILER
        BY SCREEN SIZE
        BY PRICE RANGE

BY MANUFACTURER

MANUFACTURER 1
MANUFACTURER 2
MANUFACTURER 3

MANUFACTURER 3

1. MODEL XYZ; 20 INCH COLOR
2. MODEL ABC; 35 INCH COLOR
3. MODEL JKL; 50 INCH PROJECTION

BY MANUFACTURER

THE FINEST PROJECTION SCREEN
TELEVISION ON THE MARKET!

(IMAGE OF TV)

AWARDED HIGHEST RATINGS
BY CONSUMER PROTECTORS!

WHERE CAN I BUY?
MORE INFO ABOUT JKL

OTHER TV'S
BEST PRICE

MODEL JKL

CRAZY AL'S OF YONKERS, NY SELLS
THE MODEL JKL FOR $1679.00.
THIS IS THE LOWEST PRICE OF
RETAILERS IN OUR NETWORK.

BUY NOW!

◁ ▷

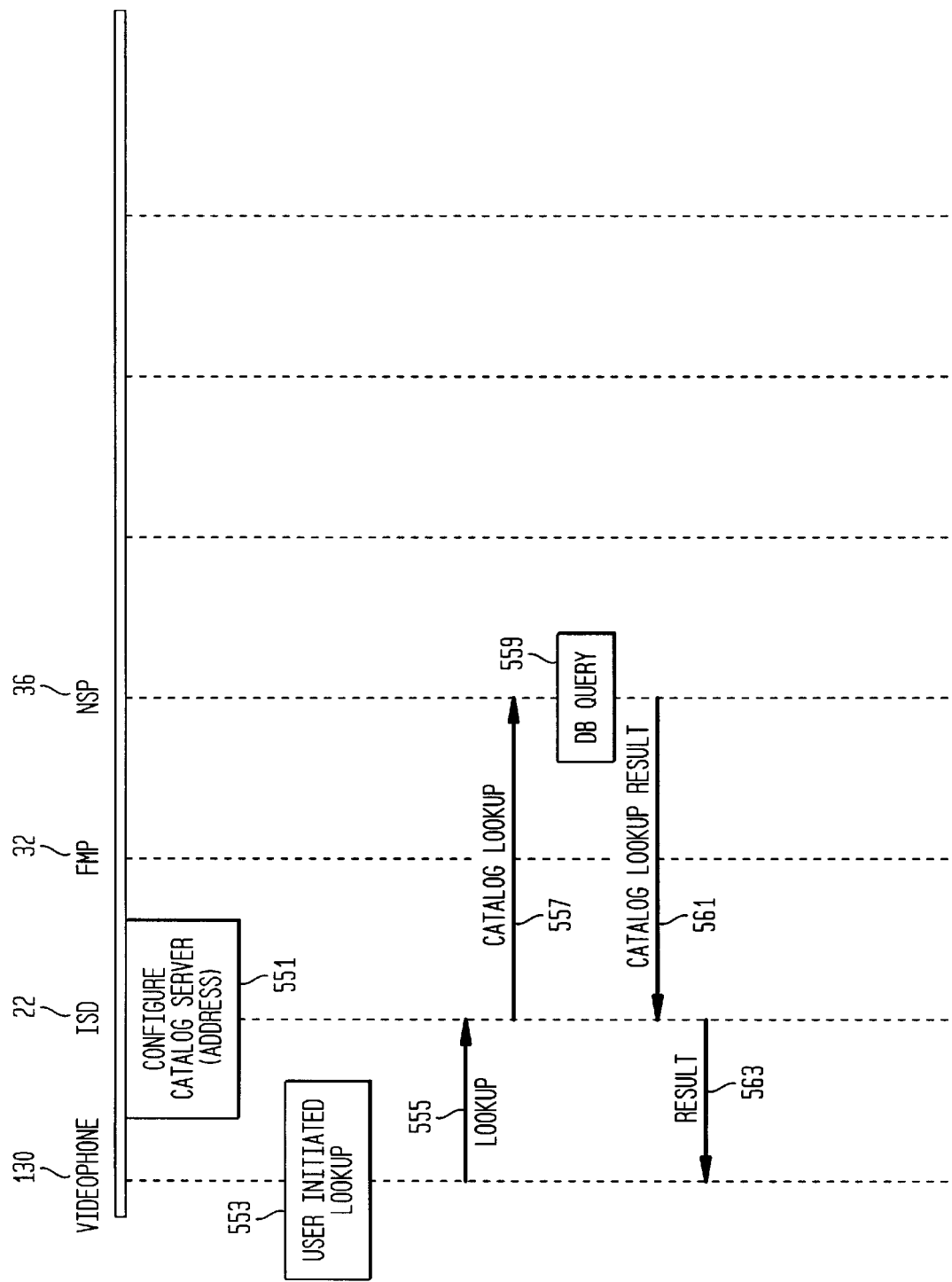

VIDEO COMMUNICATION DEVICE PROVIDING IN-HOME CATALOG SERVICES

FIELD OF THE INVENTION

This invention generally relates to a video communication device and, more particularly, to a video communication device which provides an interface for permitting purchases of products (goods) and services.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as ETHERNET transported over digital subscriber line (DSL) modems. ETHERNET is a registered trademark of Xerox Corporation. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and maling it difficult for the interexchange companies to differentiate their services. Furthermore, since DSL modem technology is not standardized, in order to ensure compatibility, the type of DSL modem provided by the local telephone company must also be provided to the end user in the customer premises equipment (CPE). Additionally, since the network is not completely controlled by the interexchange companies, it is difficult for the interexchange companies to provide data at committed delivery rates and/or desired quality levels. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. An integral part of developing such new services is providing a customer with devices and interfaces to permit easy access to an utilization of these services. In addition, these devices must be provided to customers at an affordable cost.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a videophone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

The video phone integrates a plurality of devices used to access multiple telephoning services. The device utilizes intelligent control circuitry that integrates several service access devices into one unit that has a user-friendly interface and flexible connectivity to the telephone network. The video phone creates an advantage by offering a flexible platform which gives the user the ability to place and receive phone calls while offering services that are advanced compared with traditional telephoning. Some of these services include: voice calls, video calls, voice recognition, bill paying, Internet access, advertising, e-mail, voicemail, videomail, operator services, debit card transactions, and alarm monitoring. The present invention provides systems and methods of displaying catalog information to a customer using the videophone. In a particular implementation, the customer may use the catalog information to make purchases of products and/or services. Use of the videophone and its interface to make purchases offers several advantages. The system is able to identify the customer from some identifier or IP address. The system can use this identifier or IP address to determine a delivery or shipping address of the customer to which purchased products or services are to be delivered. Thus, purchases can be made quickly and easily and do not require the time-consuming entry of shipping information. In addition, since access to the videophone in a home or a business is required to make purchases, the likelihood of fraudulent use of credit and charge cards is decreased. Finally, using revenues derived from manufacturers, retailers, and service providers whose products and services are purchased by customers, interexchange companies can offer videophones to their customers at a reduced cost.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 5A–5G are screens used for purchasing a service in accordance with the present invention.

FIGS. 6A–6F are screens used for purchasing a product in accordance with the present invention.

FIG. 7 is a flow diagram illustrating the connection of a videophone to an NSP at access catalog information.

DETAILED DESCRIPTION OF PREFERRED EMBODIMENTS

Figure 1:
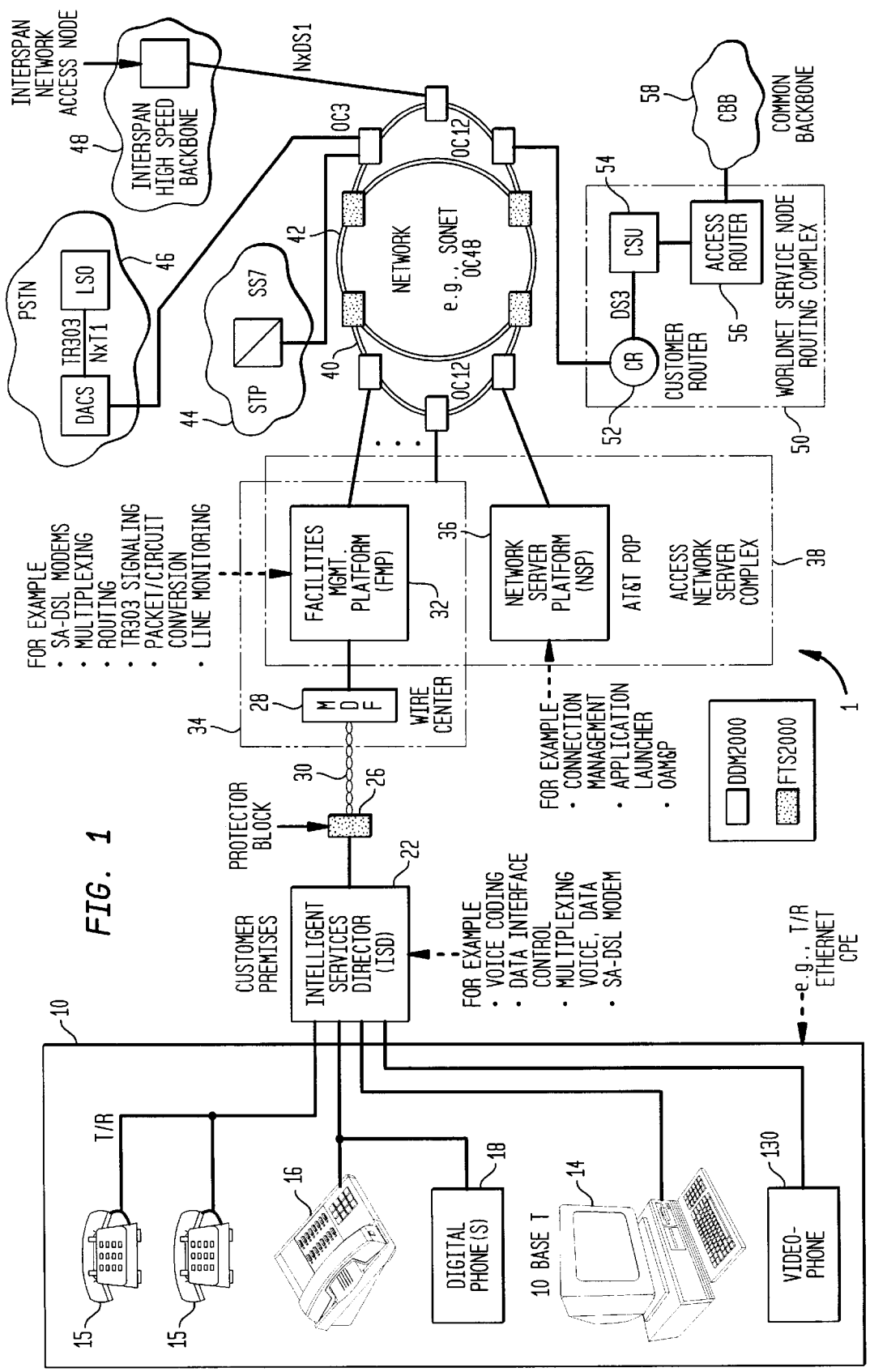
FIG. 1 illustrates an embodiment of a hybrid fiber twisted pair local loop network architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrm formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network) 44, and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET network 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment. Additionally, the service provider may collect fees from advertisers to subsidize the cost of the equipment.

Figure 2:
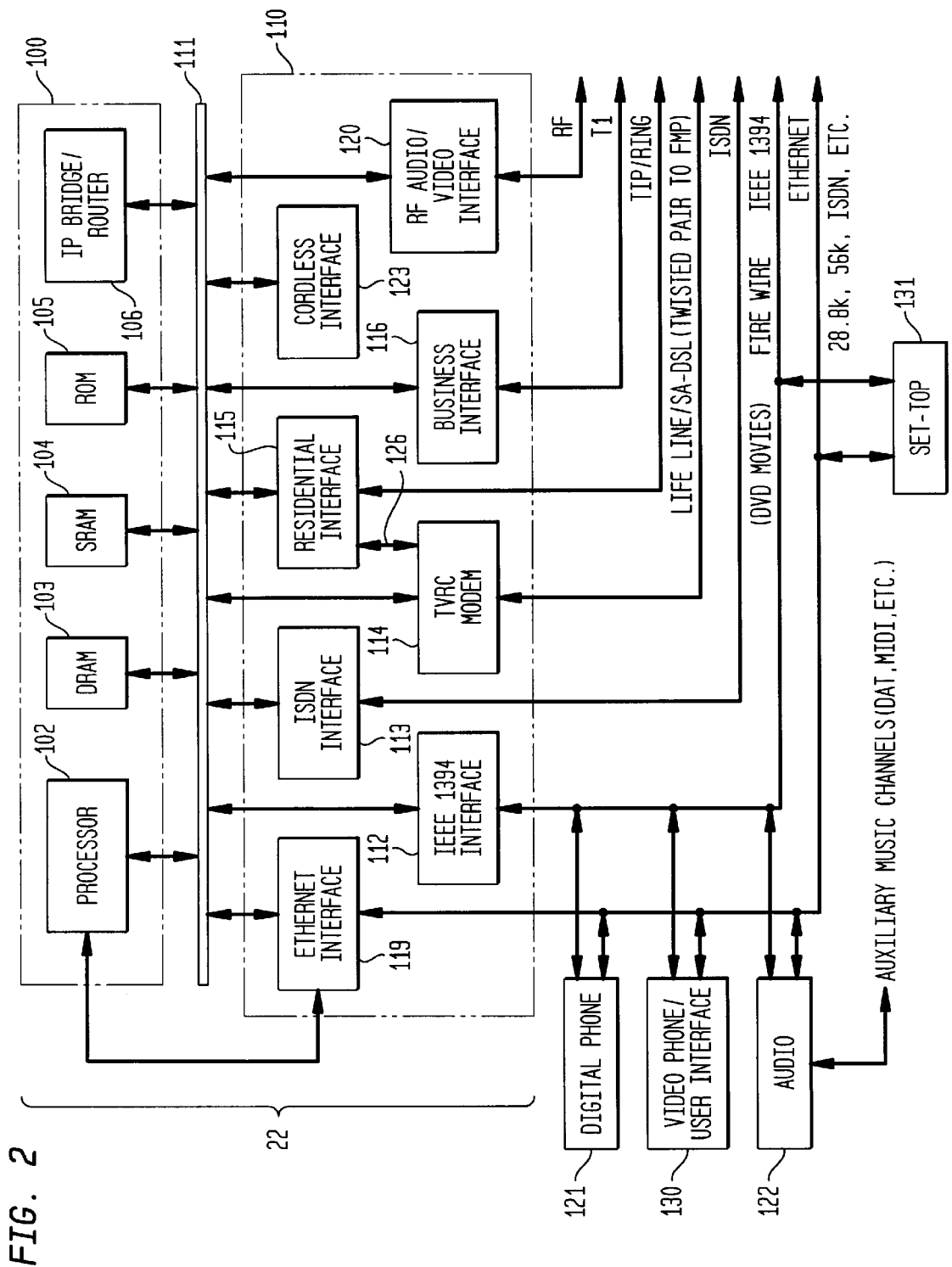
FIG. 2 is a block diagram of an embodiment of an intelligent services director (ISD) consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires, fiber, and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an ETHERNET interface 119 (for example, 28.8 kbps data, 56 kbps data, or ISDN or any other suitable bit rate service), an IEEE 1394 "fire wire" interface 112 (e.g., for a digital videodisc device (DVD)), a TVRC modem interface 114

(e.g., for a digital subscriber line (DSL) modem), a residential interface 115 (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the ETHERNET interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
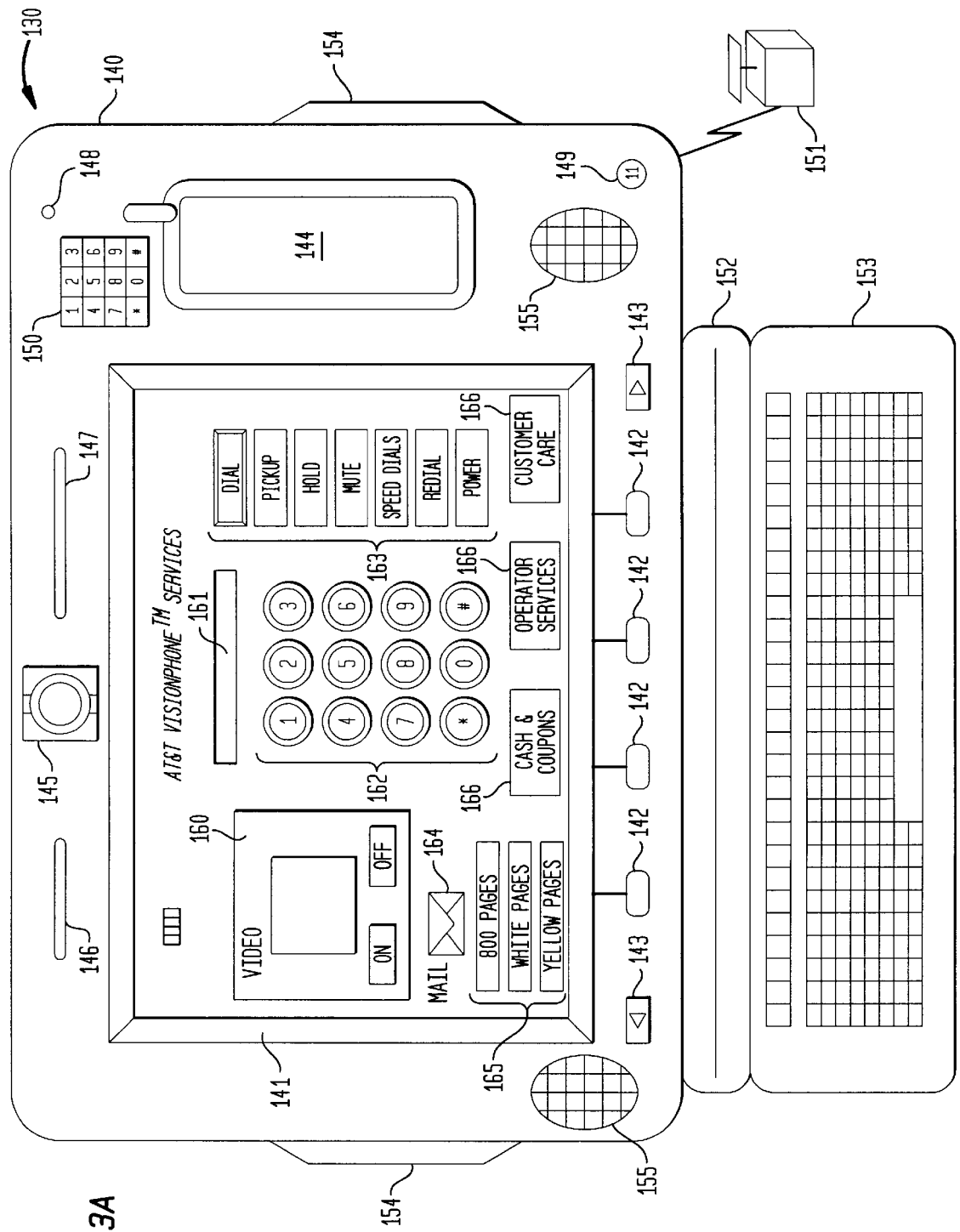
FIG. 3A and 3B illustrate an embodiment of a videophone consistent with the architecture shown in FIG. 1.
Figure 3B:
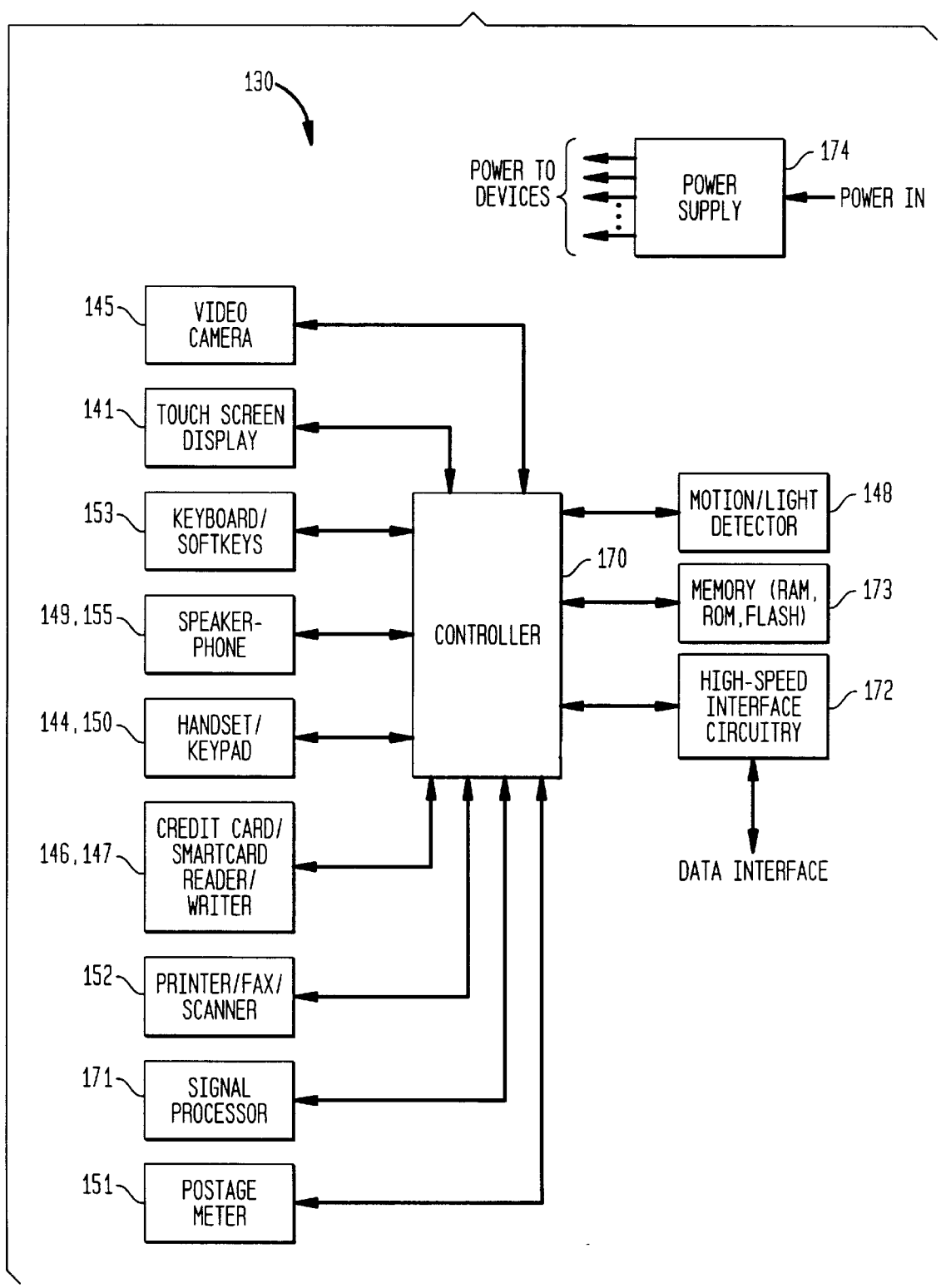

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimlle 152, and/or external speakers 154 (e.g., stereo speakers). A keyboard 153 and/or a postage scale 151 may also be connected to the videophone 130. A mouse, trackball, touchpad, etc. may also be provided as input devices, e.g., to interact with the user interface. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170. Among other functions, controller 170 serves to format the audio and video from the microphone and camera of videophone 130 in a suitable data format for transmission such as 4.323.

When the videophone 130 is used as a video telephone, the display 141 may include one or more video window(s) 160 for viewing a person to whom a customer is speaking and/or showing the picture seen by the person on the other end of the video phone. The display may also include a display window 161 for displaying the identifier, phone number, IP address, etc. of the called (or addressed) party, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
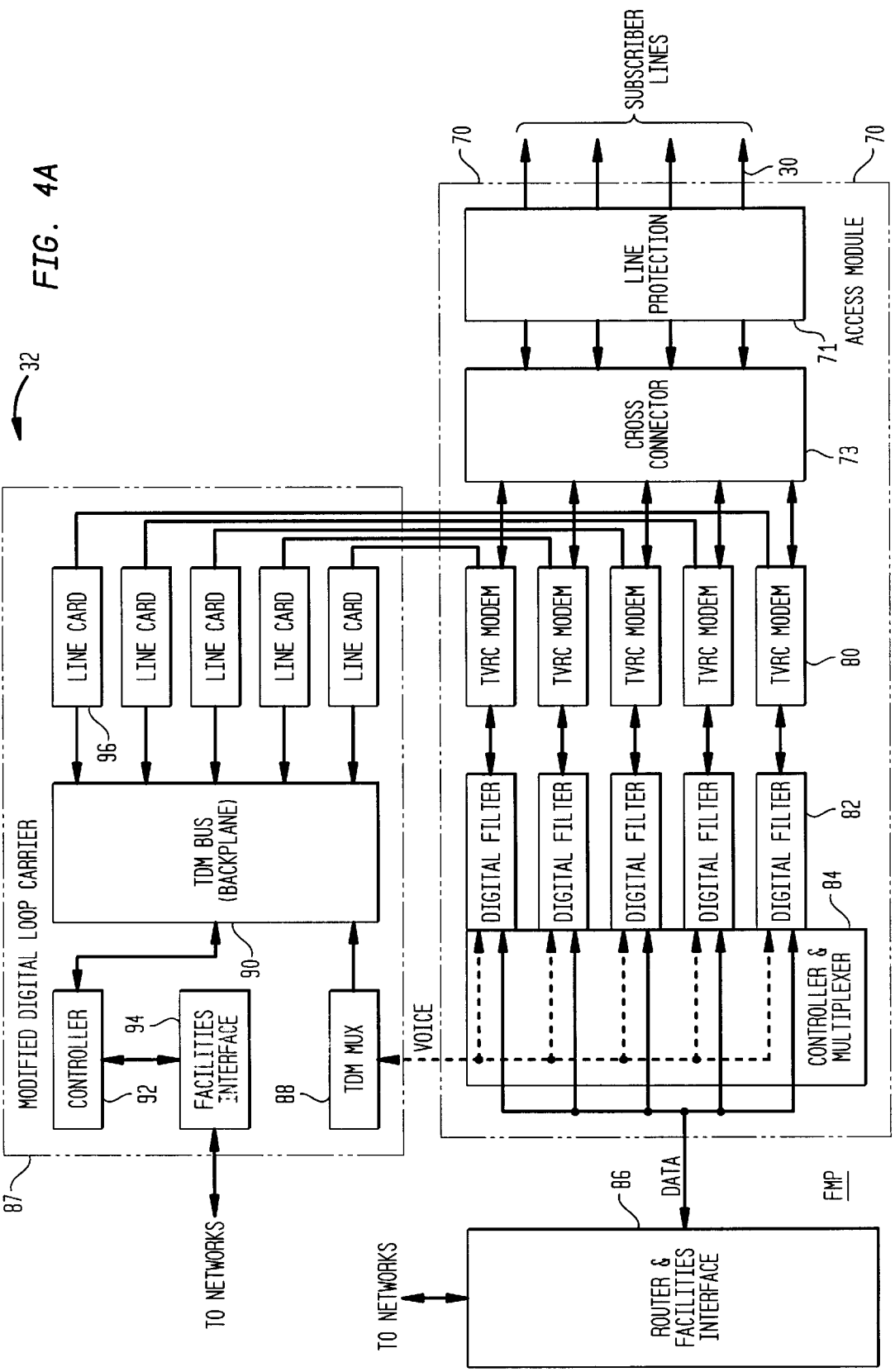
FIG. 4A is a block diagram of an embodiment of a facilities management platform (FMP) consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
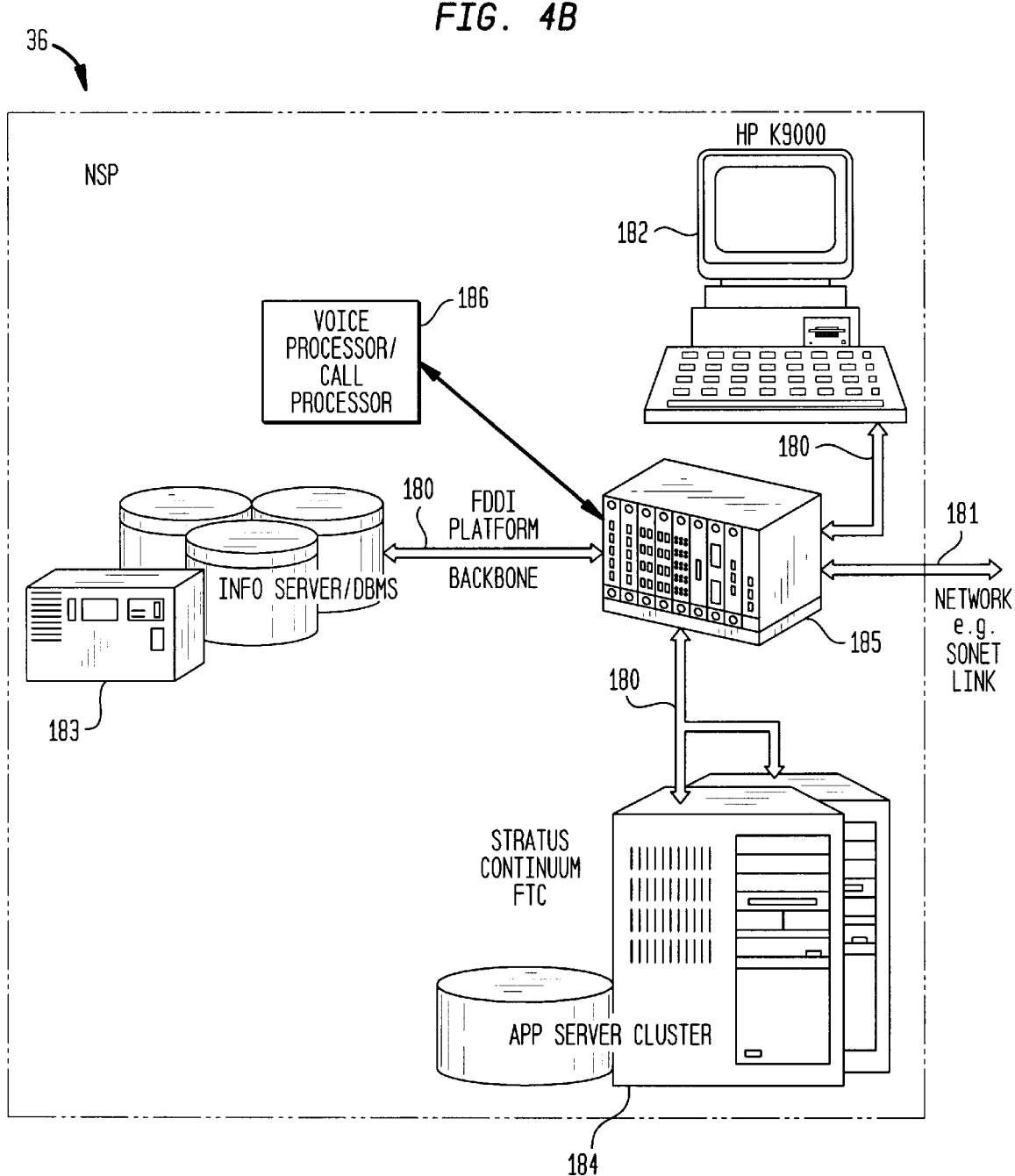
FIG. 4B illustrates a block diagram of an embodiment of a network server platform (NSP) consistent with the architecture shown in FIG. 1.

Referring to FIG. 4B, the NSP 36 may be variously configured to provide any number of services provided by a server such as information services, Internet services, pay-per-view movie services, data-base services, commercial and advertising services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or FMPs 32. The information/data base server 183 may perform storage and/or database finctions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

Figure 5A:
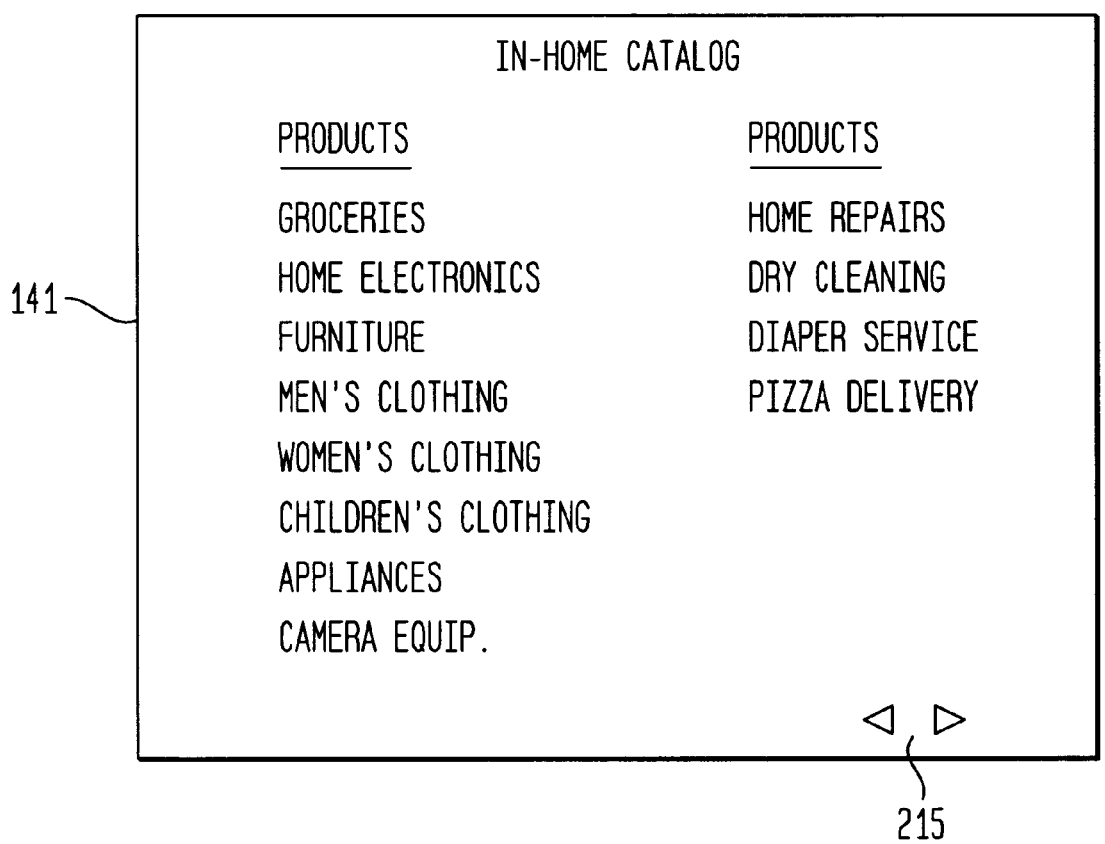

An electronic catalog interface is provided to the customer via NSP 36. These catalog interface may be accessed by touching an appropriately identified icon or button on screen 141 of videophone 130. Upon touching the button, the user is presented with an index or menu of various types of products and/or services which may be ordered as shown in FIG. 5A. Arrow icons 215 permit the user to move forward and backward through the various menus of the catalog interface. As shown in FIG. 5A, the main menu of the catalog interface may include generic product categories such as groceries, home electronics, furniture, men's clothing, women's clothing, children's clothing, appliances, camera equipment, etc. The menu may also include generic service categories such as home repairs/improvements, dry cleaning, diaper service, pizza delivery, etc. The lists of products and services may be provided on the same menu, as in FIG. 5A, or on separate menus. Of course, the lists of products and services which are displayed to customers are not limited to those shown in FIG. 5A. In practice, the lists of products and services may be customer-configured based on specified preferences which determine a customer profile, which profile may be stored by NSP 36. Alternatively, the lists may be generated by FMP 32 and/or NSP 36 for a particular customer or group of customers based on demographics and preferences determined by previous customer purchases. Again, this demographic information and previous customer purchase data may be stored by FMP 32 and/or NSP 36.

NSP 36 comprises a large database of catalog data which may be accessed by customers. This catalog data can be for products and/or services and includes a complete enumeration of the products and services, as well as corresponding descriptive details. The descriptive details can be any details that might be considered by customer making a purchase decision including, but not limited to, descriptions, pictures or images, model information, price, availability, warranty, product evaluations (e.g., Consumer Reports), advertising, etc. Through the interface of videophone 130 (e.g., menus, hypertext links, queries, reports, etc.), the customer is able to access any or all of this catalog data.

NSP 36 further includes other databases such as local directory (both telephony and Internet) address/directory number services. NSP 36 comprises significant caching memory and may be configured to access other NSP's and other directory databases from which it may obtain additional catalog data and other data. In addition, FMP 32 and/or NSP 36 stores (or has access to) shipping information of the customers. In general, each of the customers or devices connected in the network has a unique identifier or address associated therewith. FMP 32 and/or NSP 36 stores (or has access to) data which relates these unique identifiers or addresses to delivery information of the customers. During an initial use of the catalog interface, or even during an initial use of the videophone itself, the customer is given to opportunity to enter an address which he/she can designate as a delivery address for products and services. This information is supplied to FMP 32 and/or NSP 36 to generate a table or other data structure which relates the unique identifiers or addresses of the customers or devices to a delivery address. In more sophisticated implementations, a detailed purchase profile of the customers may be generated. This purchase profile may include customer preferences with regard to delivery address; a particular shipping company (e.g., U.S. Postal Service, Federal Express, any overnight delivery service, any two-day delivery service, etc.); whether the customer prefers to insure the products to be shipped; a preferred delivery time (e.g., mornings, afternoons, evenings, weekends); whether the customer prefers to purchase extended warranties; and the like. Once entered, this purchase profile is used whenever a customer makes a purchase and simplifies the purchase procedure. For example, the FMP 32 and/or NSP 36 can determine the delivery address of the customer based on the identifier or address of the videophone being used to make the purchase. Thus, there is no need for the customer to enter a delivery address each time a purchase is made. Of course, it may be desirable to configure the user interface of the videophone to solicit a confirmation from the customer that the delivery address in the customer's profile is indeed the address the customer desires the product or service to be delivered. However, such a confirmation can be accomplished by a single touch, keypress, etc. Accordingly, goods and service may be purchased quickly and easily by customers.

Figure 5B:
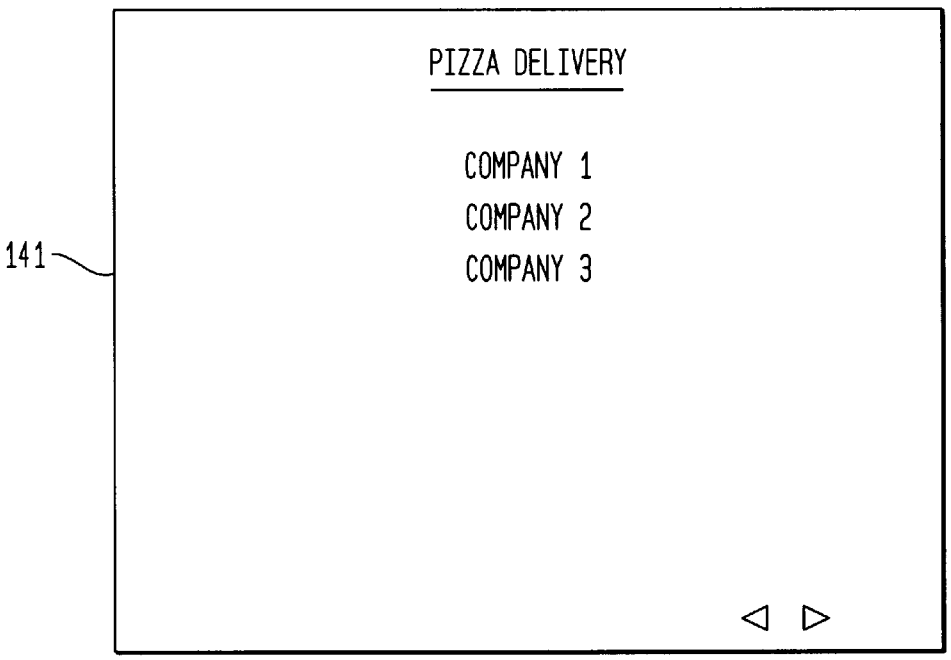
Figure 5C:
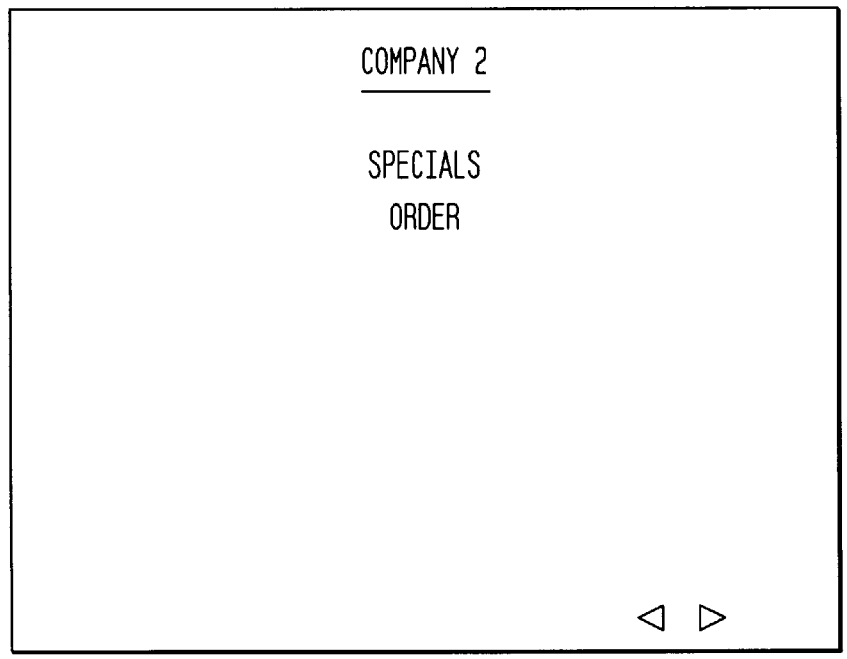

An example of the process for accessing a pizza delivery service will be explained with references to FIGS. 5A–5G. To start the process, the customer selects "Pizza Delivery" from the menu of FIG. 5A. Using the catalog data of NSP 36, an identification of companies that deliver pizza in the area in which the customer lives is presented in the menu of FIG. 5B. NSP 36 may used the identifier or address of the videophone and the delivery address associated with that videophone identifier or address to conduct a database query to determine the list of pizza companies that deliver to the delivery address. With reference to FIG. 5B, Companies 1, 2, and 3 were found to deliver to the delivery address. The user may then select one of the companies by appropriately touching screen 141. The customer may then be presented with the screen of FIG. 5C where he/she may choose to view information regarding specials or to order. If the customer selects "Order", he/she is presented with the menu of FIG. 5D from which the size of the pizza (small, medium, large), the type of pizza (regular, deep dish, hand-tossed), and the toppings (meatballs, pepperoni, sausage, and anchovies) may be selected. The customer may select from more toppings by touching "More" or some other similar prompt. In addition, the user may make a selection of other side items such as a green salad and breadsticks. When the user has finished ordering, he/she may touch "Deliver" and be presented with the screen of FIG. 5E. The screen of FIG. 5E solicits confirmation from the customer as to the delivery address. If the delivery address in incorrect, the user may touch "Change" and be presented with an opportunity to change the address using the touchscreen and/or the keyboard. If the delivery address is correct, the customer simply touches "OK" and is presented with the payment screen of FIG. 5F. The customer may select the "Pay Now" option in which case the customer will be prompted to insert a credit card into credit card reader 146, whereby the cost of the pizza will be charged to the inserted credit card. Alternatively, the customer may decide to pay cash when the pizza is delivered. Finally, the customer is presented with a "Thank You" screen thanking him/her for his/her order. Using the purchase information entered by the customer, FMP 32 and/or NSP 36 format an purchase message which is transmitted to company 2 for action. In addition, the charge data is forwarded to the customer's credit card company. The purchase message to the vendor can contain order information (e.g., what was ordered), delivery information (e.g., delivery address); and payment information (i.e., pre-paid, cash on delivery, etc.).

It will be appreciated that more sophisticated interfaces may be generated and utilized. For example, the identity and/or ordering of the companies identified on the Pizza Delivery screen of FIG. 5B may be based data regarding the companies from which the customer has previously ordered pizza. Similarly, the screen of FIG. 5D may include ordering suggestions based on previous orders. In addition, an order confirmation screen may be added which confirms the customer's order and provides an opportunity to change the order if the customer made a mistake. In addition, the network may be configured such that the company to which the order is sent sends a confirmation of receipt of the order to the customer, which confirmation is displayed on the screen 141 of videophone 130. Still further, advertising may be displayed to the customer during the purchase process.

Thus, it can be seen that the system and method of the present invention provides customers a simple process for ordering goods and services. Since all of the purchases are coordinated through FMP 32 and/or NSP 36, the customer does not need to, for example, provide a delivery address to every vendor of products and services. FMP 32 and/or NSP 36 simply routes the already stored delivery information to the appropriate vendor. The network operator may charge vendors a fee for being connected in the network and/or a fee for each service or product ordered through the network. In this way, the interexchange carrier can generate revenue which can be used to reduce or even eliminate the cost of the videophones to the customers.

The screen of FIG. 5A may also be used as an entry point for ordering products. If, for example, the customer wishes to obtain catalog information regarding televisions, the customer may select "Home Electronics" from the Products menu of FIG. 5A and "Televisions" from the Home Electronics menu of FIG. 6A. The customer is then able to choose whether to view the catalog information by manufacturer (i.e., view information regarding various televisions manufactured by a particular manufacturer); by retailer (i.e., view information regarding various televisions offered for sale by a particular retailer); by screen size (e.g., smaller than 20 inches; between 20 and 40 inches; or larger than 40 inches); or by price range (e.g., between $150–299; between $300–$599; and more than $600). If the user touches "By Manufacturer", the screen of FIG. 6C is presented and the user may look at information about televisions of a particular manufacturer (i.e., manufacturer 1, manufacturer 2, etc.) Touching manufacturer 3 will result in a display of information about the various television models offered by manufacturer 3 as shown in FIG. 6D. Touching "Model JKL" will result in the display of information about Model JKL shown in FIG. 6E. The screen provides textual and graphical information regarding Model JKL, as well as various options for the customer to obtain information about retail stores where the television can be purchased; to obtain more information about Model JKL; to obtain more information about other televisions of the manufacturer; and to obtain a best price quote. Specifically, touching "Where Can I Buy" will result in a display of retail stores near the customer where the Model JKL can be purchased. Touching "More Info About JKL" will result in a display of additional information about the Model JKL. Touching "Other TVS" will result in a display of information about other televisions manufactured by Manufacturer 3. Touching "Best Price" will cause the FMP 32 and/or NSP 36 to query the catalog information and inform the customer as to which retail store near the customer offers the Model JKL at the lowest price. Alternatively, in the case of items which can be shipped, the catalog information may be queried to find which retailer of all retailers in the database who sell the Model JKL offers the lowest price. For example, as shown in FIG. 6F, the query of the catalog information determines that Crazy Al's of Yonkers, N.Y. offers the Model JKL for $1679.00 and the customer is given the opportunity to purchase the television at that price. Selecting "Buy Now!" will bring the customer to a series of screens regarding payment options, expected delivery time, etc. As described above, FMP 32 and/or NSP 36 use the delivery profile to solicit customer input for confirming delivery address, the delivery company to be used, etc. Again, since the delivery profile data is stored by FMP 32 and/or NSP 36, the customer is able to make the purchase easily and without the need to tediously enter delivery address information, the delivery company to be used, etc.

Of course, the invention is not limited to the menu structures shown in FIGS. 5 and 6. Thus, the catalog information may be accessed using keyword searches to launch a search engine of NSP 36 which then returns to the customer for viewing on display 141 various items of information which satisfy the search criteria. The results can be presented using hypertext whereby the user is able to jump from one item of information to another in an effort to locate the desired information.

Referring now to FIG. 7, there is shown an illustrative, but non-limiting, example of service connectivity by NSP 36 to access catalog (directory) information. In the method shown in FIG. 7, any customer may directly access catalog directory services at required bandwidth (bit rate) without having to connect via a local exchange carrier (LEC). In FIG. 7, components of the system and service architecture are shown at the top including videophone 130, intelligent services director (ISD) 22, facilities management platform (FMP) 32 and network server platform (NSP) 36.

There is a great advantage in a user having access to the catalog services feature shown in FIG. 7 because the user has greater bandwidth availability and the catalog service is via NSP 36, thereby bypassing the LEC. Initially, NSP 36 provisions the catalog service availability by signaling and provisioning FMP 32 with its address, routing and other data FMP 32 needs. Initial step 551 of the service process flow diagram of FIG. 7 is directed to configuring FMP 32 to configure the ISD 22 serving the customer using videophone 130 for catalog service routing to NSP 36. As a result, FMP 32 updates the internal routing table of its memory with provisioned routing data for routing to NSP 36 and for providing in-home catalog service via ISD 22 to a particular customer using videophone 130.

In step 553, it may be assumed that a customer has pressed the appropriate icon or button on display screen 141 and wants to establish an in-home shopping session. As described above, the customer may make selections from a menu (or menus) of products and services. When the user makes a selection, videophone 130 sends a lookup message to ISD 22 at step 555. ISD 22 in turn obtains immediate access via the already provisioned FMP 32 at step 557 to NSP 36 where the catalog database is located. NSP 36 now acts as an information database service provider and performs and executes a query of the in-home catalog data to determine if it can provide the requested information and, if so, to find the information requested by the customer (step 559). If NSP 36 cannot itself provide the requested data, it determines routing for a database having the requested information, collects the information and stores the information in cache memory for forwarding to the customer. Step 561 indicates the return of the catalog lookup result to the ISD 22 and ISD supplied the lookup result to display 141 of videophone 130 at step 563.

Since the catalog interface of the present invention permits the purchase of goods and services and some of these goods and services may be purchased on a pay later basis (e.g., pizza delivery), it may be desirable to password protect access to the catalog service. In one implementation, entry of an appropriate password may be required to access the main menu screen of FIG. 5A. In an alternative implementation, the entry of an appropriate password is required only at the time of purchase. In this latter implementation, a customer may still access the catalog information, but will only be able to make a purchase upon entry of an appropriate password. In still another implementation, different password levels may be utilized. For example, for purchases less than a certain dollar amount (e.g., $100), entry of an appropriate first level password is required. For purchases greater than this dollar amount, a second, higher level password is required. It will be apparent than any number of password levels and dollar ranges may be utilized.

In still another variation, a customer can request and receive from FMP 32 and/or NSP 36 a display (via screen 141) or a printed record (via printer 152) of previous purchases. In this way, a customer is able to review and confirm previous purchases. Using such a display, a customer may make a status inquiry regarding a product or service which has been purchased, but not yet delivered (pending purchase). Specifically, by touching a display of the purchase record of a pending purchase, a message may be sent to FMP 32 and/or NSP 36 requesting that a status request be transmitted to the vendor. The status response from the vendor may then be routed to the display 141 of videophone 130.

The following applications, filed concurrently herewith, are hereby incorporated by reference:

1. A Hybrid Fiber Twisted-pair Local Loop Network Service Architecture (U.S. application Ser. No. 09/001,360, filed Dec. 31, 1997);
2. Dynamic Bandwidth Allocation for use in the Hybrid Fiber Twisted-pair Local Loop Network Service Architecture (U.S. application Ser. No. 09/001,425, filed Dec. 31, 1997);
3. The VideoPhone (U.S. application Ser. No. 09/001,905, filed Dec. 31, 1997);
4. VideoPhone Privacy Activator (U.S. application Ser. No. 09/001,909, filed Dec. 31, 1997);
5. VideoPhone Form Factor (U.S. application Ser. No. 09/001,583, filed Dec. 31, 1997);
6. VideoPhone Centrally Controlled User Interface With User Selectable Options (U.S. application Ser. No. 09/001,576, filed Dec. 31, 1997);
7. VideoPhone User Interface Having Multiple Menu Hierarchies (U.S. application Ser. No. 09/001,908, filed Dec. 31, 1997);
8. VideoPhone Blocker (U.S. application Ser. No. 09/001,353, filed Dec. 31, 1997);
9. VideoPhone Inter-com For Extension Phones (U.S. application Ser. No. 09/001,358, filed Dec. 31, 1997);
10. Advertising Screen Saver (U.S. application Ser. No. 09/001,574, filed Dec. 31, 1997);
11. Information Display for a Visual Communication Device (U.S. application Ser. No. 09/001,906, filed Dec. 31, 1997);
12. VideoPhone Multimedia Announcement Answering Machine (U.S. application Ser. No. 09/001,911, filed Dec. 31, 1997);
13. VideoPhone Multimedia Announcement Message Toolkit (U.S. application Ser. No. 09/001,345, filed Dec. 31, 1997);

14. VideoPhone Multimedia Video Message Reception (U.S. application Ser. No. 09/001,362, filed Dec. 31, 1997);
15. VideoPhone Multimedia Interactive Corporate Menu Answering Machine Announcement (U.S. application Ser. No. 09/001,575, filed Dec. 31, 1997);
16. VideoPhone Multimedia Interactive On-Hold Information Menus (U.S. application Ser. No. 09/001,356, filed Dec. 31, 1997);
17. VideoPhone Advertisement When Calling Video Non-enabled VideoPhone Users (U.S. application Ser. No. 09/001,361, filed Dec. 31, 1997);
18. Motion Detection Advertising (U.S. application Ser. No. 09/001,355, filed Dec. 31, 1997);
19. Interactive Commercials (Gerszberg 55-19);
20. Video Communication Device Providing In-Home Catalog Services (U.S. application Ser. No. 09/001,421, filed Dec. 31, 1997);
21. A Multifinction Interface Facility Connecting Wideband Multiple Access Subscriber Loops With Various Networks (U.S. application Ser. No. 09/001,422, filed Dec. 31, 1997);
22. Life Line Support for Multiple Service Access on Single Twisted-pair (U.S. application Ser. No. 09/001,343, filed Dec. 31, 1997);
23. A Network Server Platform (NSP) For a Hybrid Fiber Twisted-pair (HFTP) Local Loop Network Service Architecture (U.S. application Ser. No. 09/001,582, filed Dec. 31, 1997);
24. A Communication Server Apparatus For Interactive Commercial Service (U.S. application Ser. No. 09/001,344, fled Dec. 31, 1997);
25. NSP Based Multicast Digital Program Delivery Services (U.S. application Ser. No. 09/001,580, filed Dec. 31, 1997);
26. NSP Internet, JAVA Server and VideoPhone Application Server (U.S. application Ser. No. 09/001,354, filed Dec. 31, 1997);
27. NSP WAN Interconnectivity Services for Corporate Telecommuting (U.S. application Ser. No. 09/001,540, filed Dec. 31, 1997);
28. NSP Telephone Directory White-Yellow Page Services (U.S. application Ser. No. 09/001,426, filed Dec. 31, 1997);
29. NSP Integrated Billing System For NSP services and Telephone services (U.S. application Ser. No. 09/001,359, filed Dec. 31, 1997);
30. ISD and NSP Caching Server (U.S. application Ser. No. 09/001,419, filed Dec. 31, 1997);
31. An Integrated Services Director (ISD) Overall Architecture (U.S. application Ser. No. 09/001,417, filed Dec. 31, 1997);
32. ISD and VideoPhone Customer Premise Network/VideoPhone (Customer Premises) Local House Network (U.S. application Ser. No. 09/001,418, filed Dec. 31, 1997);
33. ISD Wireless Network (U.S. application Ser. No. 09/001,363, filed Dec. 31, 1997);
34. ISD Controlled Set-Top Box (U.S. application Ser. No. 09/001,424, filed Dec. 31, 1997);
35. Integrated Remote Control and Phone (U.S. application Ser. No. 09/001,423, filed Dec. 31, 1997);
36. Integrated Remote Control and Phone User Interface (U.S. application Ser. No. 09/001,420, filed Dec. 31, 1997);
37. Integrated Remote Control and Phone Form Factor (U.S. application Ser. No. 09/001,910, filed Dec. 31, 1997);
38. VideoPhone Mail Machine (Attorney Docket No. 3493.73170);
39. Restaurant Ordering Via VideoPhone (Attorney Docket No. 3493.73171);
40. Ticket Ordering Via VideoPhone (Attorney Docket No. 3493.73712);
41. Multi-Channel Parallel/Serial Concatenated Convolutional Codes And Trellis Coded Modulation Encode/Decoder (U.S. application Ser. No. 09/001,342, filed Dec. 31, 1997);
42. Spread Spectrum Bit Allocation Algorithm (U.S. application Ser. No. 09/001,842, filed Dec. 31, 1997);
43. Digital Channelizer With Arbitrary Output Frequency (U.S. application Ser. No. 09/001,581, filed Dec. 31, 1997);
44. Method And Apparatus For Allocating Data Via Discrete Multiple Tones (U.S. application Ser. No. 08/997,167, filed Dec. 23, 1997);
45. Method And Apparatus For Reducing Near-End Cross Talk In Discrete Multi-Tone Modulators/Demodulators (U.S. application Ser. No. 08/997,176, filed Dec. 23, 1997).

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A communications system providing information regarding goods and services to system users and enabling users to purchase said goods and services, comprising:

a database server for processing catalog information regarding goods and services, said database server storing shipping data of system users and being configured to determine a lowest cost of an item of goods selected for purchase by a user;

a plurality of user terminals connectable to said database server, each user terminal having a unique terminal identifier, wherein said database server further stores a table for relating the unique terminal identifiers of said user terminals to shipping address information for the users of said terminals, said user terminals each comprising:

a touch-sensitive screen which displays catalog information about a product from said database server, to a user and which accepts user input through touch-sensitive areas on said screen and which permits a user to select an item for purchase from said catalog information; and a control unit for processing purchase selections to generate purchase data which is sent to said database server for processing.

2. The system according to claim 1, wherein the catalog information retrieved from said database server is based on user profiles stored by said database server.

3. The system of claim 1, wherein user profile comprises information based on preferences for products and services.

4. The system according to claim 1, wherein said control unit generates purchase data only if a valid password is input.

5. The system according to claim 1, wherein said control unit controls said display such that the catalog information is displayed only if a valid password is input.

6. The system according to claim 1, wherein said database network server is configured to provide a record of user purchases.

7. The system according to claim 1, wherein said control unit is responsive to a status request input regarding status of a pending purchase for generating and transmitting a status request message to said database server.

8. The system according to claim 7, wherein said database server forwards the status request message to a vendor of the pending purchase.

9. A communications system of claim 1, said database server for further returning a stored user shipping address to a user for confirmation of correct user shipping address.

10. A communications system of claim 1, said shipping data comprises user preferences of shipping company, user preference as to product insurance, user preferences of delivery times, and user preferences as to extended warranties.

11. A communications apparatus for providing catalog services, the apparatus comprising:

a display means for displaying available products and services;

an input means for receiving input order data of desired products and services;

a control unit for generating purchase data based on said input order data;

a centralized database server in communication with said control unit for processing said order data based on said purchase data.

12. A method for providing in-home catalog services to a user, the method comprising the steps of:

configuring at least one user terminal with a unique terminal identifier;

connecting the user terminal to a database server for processing catalog information regarding goods and services;

storing in said database server a table for relating the unique terminal identifier of said user terminal to shipping address information for the users of said terminal;

displaying the catalog information regarding the goods and services on a display connected to the user terminal;

receiving orders to purchase goods and services from an input device connected to the user terminal; and determining a shipping address of the user of the terminal from the table stored in said database server relating the unique terminal identifier of the user terminal to the shipping address information of the user.

13. The method of claim 12, further comprising the step of:

communicating with a control unit within said user terminal for processing said orders to generate purchase data being sent to the database server for processing.

14. The method of claim 13, further comprising the step of generating purchase data when a valid password is input via said user terminal.

15. The method of claim 12, said input device connected to the user terminal for inputting orders to purchase comprises a touch-sensitive screen for simultaneously displaying the catalog information and accepting the user purchase decision through touch responsive areas on the screen.

16. The method of claim 12, further comprising the step of determining a lowest cost of an item selected for purchase by the user.

17. The method of claim 12, further comprising the steps of:

storing a user profile based on preferences for products and services; and displaying the catalog information regarding the goods and services based on said user profile.

18. The method of claim 12, further comprising the step of:

returning the stored shipping address to the user for confirmation of correct user shipping address.

* * * * *